Figure 1:
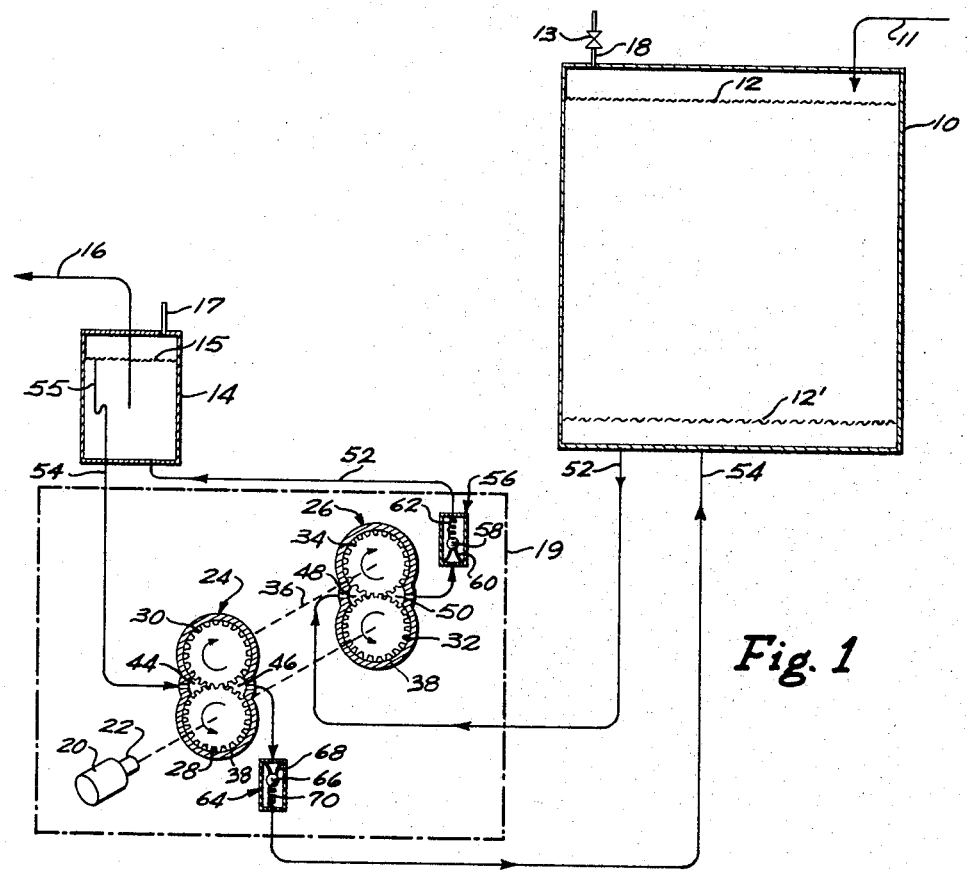

Oct. 8, 1968   B. R. WALSH   3,404,697
CONSTANT LIQUID LEVEL CONTROL APPARATUS AND METHOD
Filed Feb. 14, 1966   2 Sheets-Sheet 1

INVENTOR.
BRUCE R. WALSH

INVENTOR.
BRUCE R. WALSH

3,404,697
CONSTANT LIQUID LEVEL CONTROL APPARATUS AND METHOD

Bruce R. Walsh, Pittsburgh, Pa., assignor to Gulf Research & Development Company, Pittsburgh, Pa., a corporation of Delaware
Filed Feb. 14, 1966, Ser. No. 527,362
21 Claims (Cl. 137—13)

This invention relates to method and apparatus for maintaining a constant liquid level in a relatively small vessel or for maintaining different constant levels in separate small vessels supplied with liquid from a much larger overhead storage reservoir or from a pressurized header. Although the method and apparatus of this invention has utility in any installation requiring constant liquid level control in a vessel or vessels supplied from an overhead reservoir or from a pressurized header, it has particular utility in an oil burner installation in which the constant level vessel is advantageously of very small size in order to fit into a compact oil burner unit at the bottom of a furnace rendering precise control of liquid level by conventional methods particularly difficult. The method and apparatus of the present invention also has particular utility in an installation which requires maintenance of different constant levels in separate vessels since the same control system utilized for a single constant level vessel in accordance with the present invention can maintain different constant levels in separate vessels with no requirement for additional control parts.

In conventional oil burner installations, fuel oil is pumped to the burner nozzle under pressure. In an advantageous departure from conventional oil burners, the fuel oil is not pumped under pressure to the burner nozzle but rather is aspirated into the burner nozzle by means of a pressurized air stream. In order to operate as a completely aspirating device, this type of oil burner must draw oil solely by the aspirating effect manifested within itself. Therefore, fuel oil cannot be charged to it directly from an overhead tank since the liquid head exerted by an overhead reservoir would force oil into it under a static pressure. On the other hand, when oil flow to a pressurized air aspirating nozzle is induced solely by the aspirating effect of the pressurized air supplied to the nozzle, the flow rate of the oil is advantageously controlled solely by adjustment of the pressure of the aspirating air. The oil is exposed to the reduced pressure induced within the nozzle by the aspirating air stream. In order to insure that the oil supply to the aspirating nozzle exerts no independent pressure upon the nozzle, the oil is supplied to the reduced pressure zone induced within the nozzle from a small constant level vessel open to the atmosphere and disposed from one to several inches below the nozzle. In this manner, the liquid lift requirement upon the nozzle is both small and constant. It is apparent that if the level of the oil in the constant level vessel is not held constant, the liquid lift that the nozzle is required to impart at a fixed combustion rate will not be constant and consequently erratic combustion will result. Therefore, although the constant level vessel must be small in order to comprise a part of a compact burner unit to be disposed near the bottom of a furnace, it must additionally maintain a precisely constant level for the burner nozzle.

A conventional method for maintaining a constant level in a vessel supplied from an overhead liquid storage reservoir or from a pressurized supply header utilizes a float in the constant level vessel which actuates a flow control valve disposed in the liquid supply conduit leading to the constant level vessel. Vertical movement of the float occurs in response to the actual height of liquid in the constant level tank and causes the supply valve opening to increase, decrease or remain unchanged depending upon whether actual liquid height is below, above or at the desired liquid height, respectively. Other liquid level sensing devices are conventionally utilized in place of floats to operate a control valve, such as, for example, liquid static pressure sensitive elements. Conventional liquid level sensing device-control valve combinations are of either the on-off or proportional control types.

In a conventional constant level control system supplying a demand which is both erratic and large relative to the capacity of the constant level vessel there is generally an appreciable time lag between a deviation in liquid level from the control point and a stable return of the level to the control point because the corrective action of the control system tends to induce overshooting and undershooting of the control point. If the demand upon the constant level vessel is continuous and nonuniform the control system is likely to induce continuous hunting of the level of liquid about the control point. Furthermore, if there is a varying pressure in the liquid supply conduit or a varying height in the liquid level of an overhead liquid supply reservoir, the control apparatus may be incapable of maintaining the level of the liquid at a preset control point. Certainly, if a combination of these conditions of instability should occur steady maintenance of a preset liquid level would be very difficult or impossible to attain.

The apparatus and method of this invention are capable of maintaining a constant liquid level in a relatively small vessel supplied from a large overhead liquid reservoir or from a pressurized header without utilizing either a level sensing means or a control valve. Furthermore, the apparatus and method of the present invention are capable of maintaining a constant level in a vessel supplied with liquid from a higher level or pressure in the absence of even the smallest departure from a set control level. Therefore, in accordance with the present invention the aforementioned difficulties inherent in conventional liquid level control systems which utilize a level sensing means and a control valve are avoided. Since the apparatus and method of the present invention prevents any deviation of the actual level of liquid from the control level for even the most limited time interval, the problems of time lag and overshooting and undershooting the control point which are inherent in conventional control systems disappear. While the accuracy of a conventional control system is severely affected by a varying pressure in the liquid supply header or a varying liquid level in an overhead supply reservoir, the level control method and apparatus of the present invention is immune to these variations.

The present invention therefore represents a substantial departure from conventional means and methods for control of liquid level in a vessel supplied from an overhead reservoir or a pressurized header both in regard to apparatus and in regard to control stability inherent thereto. In regard to apparatus, the present invention differs from conventional apparatus by controlling liquid level in a vessel supplied from an overhead reservoir or a pressurized header without utilizing either a level sensing means or a control valve actuated by said sensing means. In regard to control stability the apparatus and method of this invention maintains the level of the liquid in a vessel supplied from an overhead reservoir or a pressurized header steadily and undeviatingly at the control point and therefore avoids the instabilities inherent in conventional level control systems such as time lag, overshooting the undershooting of the control point, continuous hunting about the control point and prolonged deviation from the control point.

In accordance with the present invention a constant liquid level is maintained in a relatively small vessel which is under atmospheric pressure and supplied with liquid from either a relatively large overhead reservoir or a pressurized header by injecting liquid from said overhead reservoir or pressurized header to said constant level vessel by positive displacement pumping through a normally closed liquid-tight valve which is resiliently urged open only by the injection pumping fluid pressure, and concomitantly draining off all liquid tending to rise above the control level in said constant level vessel and injecting said liquid back to said overhead reservoir or pressurized header by positive displacement pumping through another normally closed liquid-tight valve which is resiliently urged open only by the injection pumping fluid pressure. The liquid is injected by positive displacement into the constant level vessel at a flow rate related to the demand upon the vessel which is sufficiently great to at least maintain the level at the point of drain-off while the injection flow rate capacity of the return positive displacement pump is sufficiently great to prevent a level of liquid above the point of drainage.

It is a remarkable feature of the present invention that without any additional positive displacement pumps or normally closed resilient valves the system utilized to maintain a constant level in a single vessel can be advantageously utilized to maintain a constant level in a plurality of individual vessels, with the level in each vessel being different from that of any other vessel. This is a highly unusual feature of the present invention because a conventional level control system utilizing a float or other level sensing means requires an additional float or other control means and an additional control valve for each constant level vessel.

Figure 2:
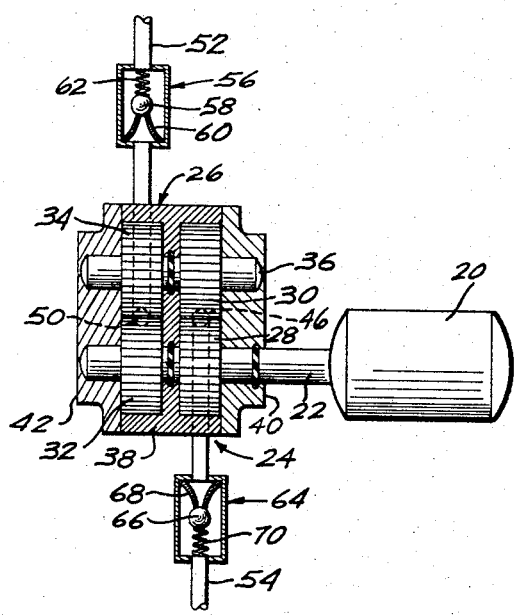
Figure 3:
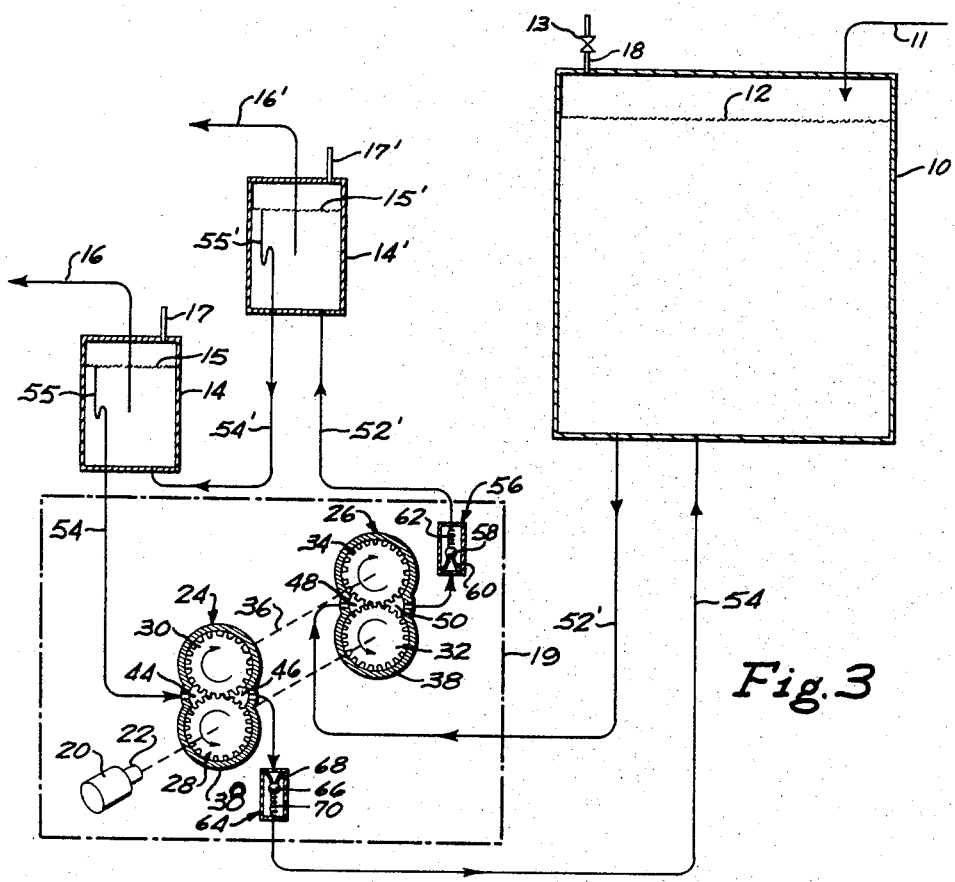

The method and apparatus of the present invention is best explained by reference to the accompanying drawings in which FIGURES 1 and 3 are schematic views of different embodiments of the apparatus of the invention and FIGURE 2 is an interior view of the structure enclosed by the dashed lines in FIGURES 1 and 3.

FIGURE 1 shows a relatively alrge overhead storage reservoir 10 supplied with liquid through line 11 and having a liquid level 12. Reservoir 10 supplies liquid to a relatively small constant level vessel 14 having a liquid level 15 and a discharge conduit 16 which can connect to an aspirating burner nozzle disposed from one to several inches above liquid level 15 which utilizes pressurized air to aspirate fuel oil from vessel 14. Vessel 14 is open to the atmosphere through vent 17. Reservoir 10 can be pressurized by closing valve 13 in vent 18 or, more commonly, is maintained under atmospheric pressure by opening valve 13. Level 15 in vessel 14 is disposed on a lower level than level 12 in reservoir 10. However, the apparatus would function similarly even if the level in reservoir 10 should fall to 12' which is below control level 15 in vessel 14. The apparatus for maintaining a constant liquid level in vessel 14 is enclosed by dashed enclosure lines 19.

The constant level apparatus within dashed lines 19 is shown clearly in both FIGURES 1 and 2. As shown in both figures, motor 20 rotates drive shaft 22. Positive displacement gear pumps 24 and 26 are operated in unison drive shaft 22. Pump 24 comprises intermeshing gears 28 and 30 and pump 26 comprises intermeshing gears 32 and 34. Gears 28 and 32 are mounted on drive shaft 22 and gears 30 and 34 are mounted on driven shaft 36. Pumps 24 and 26 have a common housing 38 which is sandwiched between end plates 40 and 42. Pump housing 38 defines a liquid inlet chamber 44 and a liquid discharge chamber 46 in pump 24 and also defines a liquid inlet chamber 48 and a liquid discharge chamber 50 in pump 26. As shown in FIGURE 2, pumps 24 and 26 are sealed against fluid leakage along shafts 22 and 36. The end of shaft 22 and both ends of shaft 36 are encased in end plates 40 and 42 while rubber O-rings provide fluid-tight sealing on the shafts between pumps 24 and 26 and between pump 24 and motor 20.

A conduit 52 extends from overhead reservoir 10 to constant level vessel 14 and a conduit 54 extends from liquid level 15 in constant level vessel 14 to the bottom of reservoir 10. The terminus of conduit 54 within vessel 14 comprises a flexible portion 55 which is vertically adjustable by any suitable means to permit variation of the control level in vessel 14.

Constant displacement pump 26 is disposed in conduit 52 and a substantially liquid-tight spring loaded normally closed resilient valve 56 is also disposed in conduit 52 in series with pump 26 near the discharge thereof. Resilient valve 56 comprises a ball 58 which is urged against valve seat 60 by means of spring 62 which is under compression. The compressive stress in spring 62 is greater than the pressure exerted by the liquid in reservoir 10 so that when pump 26 is not operating liquid from reservoir 10 cannot flow through the clearances in pump 26 to vessel 14. When positive displacement pump 26 is in operation, it is capable of building up a liquid pressure sufficient to overcome the force exerted by spring 62 against ball 58 to force fluid through injector valve 56.

Constant displacement pump 24 is disposed in conduit 54 and substantially liquid-tight spring loaded normally closed resilient valve 64 is disposed in conduit 54 in series with pump 24 near the discharge thereof. Resilient valve 64 comprises a ball 66 which is urged against valve seat 68 by means of spring 70 which is under compression. Spring loaded valve 64 is normally in a closed position primarily because of the action of spring 70 and, to a lesser extent, because of the static pressure of liquid in reservoir 10. Therefore, when pump 24 is not operating, liquid from reservoir 10 cannot flow through the clearances in pump 24 to vessel 14. When positive displacement pump 24 is in operation it is capable of creating a discharge liquid pressure sufficient to open valve 64 and to force liquid therethrough.

Positive displacement pump 24 and positive displacement pump 26 are advantageously similar to each other in size, flow rate and discharge pressure characteristics. Valves 56 and 64 are advantageously similar to each other in flow capacity at a given pressure and in spring stress characteristics. The spring stress characteristics of each valve is sufficiently great to permit each valve to open only under the pressure exerted by its associated pump and not by any other pressure in the system.

When operating the apparatus, the only control setting required is to position the flexible open terminus 55 of pipe 54 at the desired control liquid level. Motor 20 is then turned on and rotation of shaft 22 causes positive displacement gear pumps 24 and 26 to operate. Therefore, a single motor operates both pumps in unison. Since pumps 24 and 26 are operated on a common shaft they begin and terminate operation at the same time. Until pumps 24 and 26 build up adequate discharge pressures, no flow will occur in either direction between overhead reservoir 10 and constant level vessel 14 because of normally closed spring loaded valves 56 and 64 which remain in a substantially liquid-tight closed position against any pressures in the system except the operating discharge pressures of their associated pumps.

Pump 26 takes liquid from overhead reservoir 10 through line 52 and pumps it under a positive pressure through valve 56 against the action of spring 62 into constant level vessel 14. The pumping flow rate of pump 26 is greater than the maximum withdrawal flow rate from vessel 14 through line 16 and therefore the liquid in vessel 14 rises to level 15 which is established by flexible pipe terminus 55. The liquid in vessel 14 cannot rise above level 15 because at that level it is withdrawn as rapidly as it appears through open flexible pipe terminus 55 by means of pump 24.

Pump 24 advantageously has a volumetric flow rate capacity at least equal to that of pump 26 so that even if no liquid is being withdrawn from constant level vessel 14 through pipe 16 pump 24 can withdraw the entire quantity of liquid supplied to vessel 14. The minimal flow rate capacity of pump 24 must at least be equal to the input rate of pump 26 less the withdrawal flow rate through pipe 16. Pump 24 forces the portion of the liquid which overflows into flexible tube 55 through valve 64 against the action of spring 70 back to overhead reservoir 10.

Pump 26 operates upon the rotation of gears 32 and 34 in the direction indicated by the arrows in FIGURE 1 whereby liquid in pump inlet chamber 48 is entrained between adjacent teeth in the gears 32 and 34 and is carried along the interior arcuate surface of pump casing 38 to pump discharge chamber 50. Similarly, pump 24 operates upon the rotation of gears 28 and 30 in the direction indicated by the arrows in FIGURE 1 whereby liquid in pump inlet chamber 44 is entrained between adjacent teeth in the gears 28 and 30 and carried along the interior arcuate surface of pump casing 38 to pump discharge chamber 46.

Gear pumps 24 and 26 transmit fluid by positive displacement action and can be replaced by other types of pumps which operate on the positive displacement principle, such as vane-type pumps. However, positive displacement pumps of all types necessarily have clearances between adjacent stationary and moving parts in order to permit relative movement of said parts. Therefore, positive displacement pumps such as pumps 24 and 26 cannot constitute a fluid-tight seal between overhead reservoir 10 and constant level vessel 14. In the absence of spring loaded valves 56 and 64, when motor 20 is not in operation liquid from overhead reservoir 10 would seep through internal clearances in both pumps 24 and 26 and readily overflow through vent 17 and pipe 16 leading from relatively small constant level vessel 14. Even in an installation wherein overhead reservoir 10 and constant level vessel 14 were maintained under equalized superatmospheric pressure by connecting pipe 17 and 18 to each other and opening valve 13, liquid overflow could still occur through pipe 16. Spring loaded normally closed valves 56 and 64 provide a fluid-tight seal between overhead reservoir 10 and constant level vessel 14 when motor 20 is not in operation. These valves can be replaced by other suitable liquid-tight valves which are normally closed but which resiliently open under the action of pumps 24 and 26 during operation thereof.

It is a remarkable feature of the present invention that the single liquid level control apparatus shown within the dashed lines 19 of FIGURE 1 can maintain different constant levels of liquid in a plurality of separate vessels. FIGURE 3 shows an apparatus which is similar to the apparatus of FIGURE 1 except that a second constant level vessel 14' is present in addition to and at a higher level than constant level vessel 14. Pump 26 supplies liquid to constant level vessel 14' through conduit 52' and injection valve 56. Constant level vessel 14' is provided with an atmospheric vent 17'. Liquid can be drawn off from constant level vessel 14' through line 16'. A constant level 15' in vessel 14' is established by and corresponds to the height at which vertically adjustable flexible pipe portion 55' is disposed. The open end of flexible pipe portion 55' permits overflow of any liquid in constant level vessel 14' tending to rise above level 15' to the bottom of vessel 14 through pipe 54'.

In the operation of the embodiment of FIGURE 3, constant displacement pump 26 injects liquid from reservoir 10 through injection valve 56 and conduit 52' into constant level vessel 14'. A portion of the injected liquid is withdrawn for use through line 16'. The vertical position of flexible conduit portion 55' establishes constant level 15' and liquid tending to rise above level 15' overflows and is drained off through line 54' to vessel 14. Pump 26 produces a volumetric flow rate at least as great as the maximum withdrawal rate through line 16' plus the maximum withdrawal rate through line 16. Return pump 24 preferably produces the same volumetric flow rate as pump 26. Therefore, the total volumetric requirements of both line 16' and 16 is charged to vessel 14' and the liquid destined to be drawn off through line 16 overflows through the tube portion 55' and pipe 54' into vessel 14.

The embodiment of FIGURE 3 possesses high utility where constant level vessels 14 and 14' are each part of independent oil aspirating burner assemblies in close proximity to each other but on slightly different levels. Specifically, in a domestic installation, a hot air furnace and a hot water heater are generally disposed in close proximity to each other and are supplied from a common oil reservoir but the burner units are on slightly different horizontal levels. Constant level vessels 14 and 14' can be disposed as part of a hot air furnace burner assembly and a hot water heater burner assembly, respectively, on slightly different levels from each other. The level in vessel 14 is controlled independently of the level in vessel 14'.

It will be appreciated that the level in more than two vessels can be controlled with the same apparatus shown within dashed lines 19 of FIGURE 3. For example, one or a plurality of additional constant level vessels, the liquid in each being at progressively higher horizontal levels, could be incorporated into the control system shown in FIGURE 3 with the overflow from the constant level vessel having the highest liquid level draining to the constant level vessel having the next highest liquid level, etc. Instead of employing separate constant level vessels, a single constant level vessel having fluid-tight partitions to separate compartments thereof could be utilized with a vertically adjustable overflow or drainage line extending from the control level in the compartment having the highest liquid level to the compartment having the next highest liquid level, etc.

Various changes and modifications can be made without departing from the spirit of this invention or the scope thereof as defined in the following claims.

I claim:

1. A liquid level control apparatus for maintaining a constant level in a vessel supplied with liquid from an overhead reservoir comprising first conduit means for extending between said overhead reservoir and said constant level vessel, a first positive displacement pump for pumping liquid from said overhead reservoir to said constant level vessel and a first substantially liquid-tight normally closed valve which is resiliently urged open by said first positive displacement pump disposed in series in said first conduit means, second conduit means for extending between said overhead reservoir and the control level in said constant level vessel, a second positive displacement pump for pumping liquid from the control level in said constant level vessel to said overhead reservoir and a second substantially liquid-tight normally closed valve which is resiliently urged open by said second positive displacement pump disposed in series in said second conduit means.

2. The apparatus of claim 1 wherein said first normally closed valve is disposed near the discharge of said first positive displacement pump.

3. The apparatus of claim 1 wherein said second normally closed valve is disposed near the discharge of said second positive displacement pump.

4. The apparatus of claim 1 wherein said first normally closed valve is disposed near the discharge of said first positive displacement pump and is spring-loaded for opening only under the influence of the discharge pressure of said first pump.

5. The apparatus of claim 1 wherein said second normally closed valve is disposed near the discharge of said second positive displacement pump and is spring-loaded for opening only under the influence of the discharge pressure of said second pump.

6. The apparatus of claim 1 wherein the control level is adjustable by adjusting the position of the terminus of said second conduit means in said constant level vessel.

7. The apparatus of claim 1 including a single motor means for driving said first and said second positive displacement pumps in unison.

8. The apparatus of claim 1 including a constant level vessel which is vented to the atmosphere.

9. The apparatus of claim 8 including conduit means in addition to said second conduit means for withdrawing liquid from said constant level vessel.

10. The apparatus of claim 1 including an overhead reservoir.

11. The apparatus of claim 10 including conduit means in addition to said second conduit means for adding liquid to said overhead reservoir.

12. A liquid level control apparatus comprising a constant level vessel open to the atmosphere, an overhead reservoir, first conduit means extending between said overhead reservoir and said constant level vessel, a first positive displacement pump for pumping liquid from said overhead reservoir to said constant level vessel and a first substantially liquid-tight normally closed spring-loaded valve disposed in series with each other in said first conduit means, said first valve disposed near the discharge of said first pump for resiliently opening under the influence of the discharge pressure of said first pump, second conduit means extending from the overhead reservoir to the control level in said constant level vessel, the position of the terminus of said second conduit means in said constant level vessel being adjustable for adjusting said control level, a second positive displacement pump for pumping liquid from the control level in said constant level vessel to said overhead reservoir and a second substantially liquid-tight normally closed spring-loaded valve disposed in series with each other in said second conduit means, said second valve disposed near the discharge of said second pump for resiliently opening under the influence of the discharge pressure of said second pump, and a single motor means for driving said first pump and said second pump in unison.

13. A liquid level control apparatus for maintaining a constant level in a vessel supplied with liquid from a pressurized header comprising first conduit means for extending between said pressurized header and said constant level vessel, a first positive displacement pump for pumping liquid from said pressurized header to said constant level vessel and a first substantially liquid-tight normally closed valve which is resiliently urged open by the discharge pressure of said first positive displacement pump disposed in series in said first conduit means, second conduit means for extending between said pressurized header and the control level in said constant level vessel, a second positive displacement pump for pumping liquid from the control level in said constant level vessel to said pressurized header and a second substantially liquid-tight normally closed valve which is resiliently urged open by the discharge pressure of said second positive displacement pump disposed in series in said second conduit means.

14. A method for maintaining a constant level in a vessel supplied with liquid from an overhead reservoir comprising injecting liquid from said overhead reservoir to said constant level vessel by positive displacement pumping through a normally closed liquid-tight valve which is resiliently urged open by the injection pumping liquid pressure, and concomitantly drawing off liquid tending to rise above the control level in said constant level vessel and injecting said liquid back to said overhead reservoir by positive displacement pumping through another normally closed liquid-tight valve which is resiliently urged open by the injection pumping fluid pressure.

15. The method of claim 14 including the step of adjusting the control level in said constant level vessel.

16. The method of claim 14 including the step of withdrawing a portion of the liquid from said constant level vessel so that only a portion of said liquid injected thereinto is injected back to said overhead reservoir.

17. A method for maintaining a constant level in a vessel under atmospheric pressure supplied with liquid from a header at a relatively higher pressure comprising injecting liquid from said header to said constant level vessel by positive displacement pumping through a normally closed liquid-tight valve which is resiliently urged open by the injection pumping liquid pressure, withdrawing liquid from said constant level vessel, and concomitantly drawing off liquid tending to rise above the control level in said constant level vessel and injecting said liquid back to said header by positive displacement pumping through another normally closed liquid-tight valve which is resiliently urged open by the injection pumping fluid pressure.

18. A liquid level control apparatus comprising at least two constant level vessels for maintaining liquid at different constant levels, an overhead reservoir, first conduit means for extending between said overhead reservoir and the constant level vessel having the highest liquid level, overflow conduit means extending between the control level in each constant level vessel to the constant level vessel having the next highest liquid level, a first positive displacement pump for pumping liquid from said overhead reservoir to the constant level vessel having the highest liquid level and a first substantially liquid-tight normally closed valve which is resiliently urged open by said first positive displacement pump disposed in series in said first conduit means, second conduit means for extending between said overhead reservoir and the control level in the constant level vessel having the lowest liquid level, a second positive displacement pump for pumping liquid from the control level in the constant level vessel having the lowest liquid level to said overhead reservoir and a second substantially liquid-tight normally closed valve which is resiliently urged open by said second positive displacement pump disposed in series in said second conduit means.

19. A liquid level control apparatus comprising at least two constant level vessels for maintaining liquid at different constant levels, a pressurized header, first conduit means for extending between said pressurized header and the constant level vessel having the highest liquid level, overflow conduit means extending between the control level in each constant level vessel to the constant level vessel having the next highest liquid level, a first positive displacement pump for pumping liquid from said pressurized header to the constant level vessel having the highest liquid level and a first substantially liquid-tight normally closed valve which is resiliently urged open by said first positive displacement pump disposed in series in said first conduit means, second conduit means for extending between said pressurized header and the control level in the constant level vessel having the lowest liquid level, a second positive displacement pump for pumping liquid from the control level in the constant level vessel having the lowest liquid level to said pressurized header and a second substantially liquid-tight normally closed valve which is resiliently urged open by said second positive displacement pump disposed in series in said second conduit means.

20. A method for maintaining diffferent constant levels in separate constant level vessels supplied with liquid from an overhead reservoir comprising injecting liquid from said overhead reservoir to the constant level vessel having the highest liquid level by positive displacement pumping through a normally closed liquid-tight valve which is resiliently urged open by the injection pumping liquid pressure, draining liquid tending to rise above the control level in each constant level vessel to the constant level vessel having the next highest liquid level, draining liquid tending to rise above the control level in the constant level vessel having the lowest level and injecting said liquid back to said overhead reservoir by positive displacement pumping through another normally closed liquid-tight valve which is resiliently urged open by the injection pumping fluid pressure.

21. A method for maintaining different constant levels in seperate constant level vessels supplied with liquid from a pressurized header comprising injecting liquid from said pressurized header to the constant level vessel having the highest liquid level by positive displacement pumping through a normally closed liquid-tight valve which is resiliently urged open by the injection pumping liquid pressure, draining liquid tending to rise above the control level in each constant level vessel to the constant level vessel having the next highest liquid level, draining off liquid tending to rise above the control level in the constant level vessel having the lowest level and injecting said liquid back to said pressurized header by positive displacement pumping through another normally closed liquid-tight valve which is resiliently urged open by the injection pumping fluid pressure.

References Cited

UNITED STATES PATENTS

| 2,225,498 | 12/1940 | Hollander | 137—563 |
| 2,287,396 | 6/1942 | Roth | 137—563 |

FOREIGN PATENTS

| 100,477 | 3/1937 | Australia. |

M. CARY NELSON, *Primary Examiner.*

W. CLINE, *Assistant Examiner.*